United States Patent [19]

Evans

[11] Patent Number: 4,992,910
[45] Date of Patent: Feb. 12, 1991

[54] ELECTRICAL COMPONENT PACKAGE

[75] Inventor: David A. Evans, Seekonk, Mass.

[73] Assignee: The Evans Findings Company, Inc., East Providence, R.I.

[21] Appl. No.: 506,519

[22] Filed: Apr. 9, 1990

Related U.S. Application Data

[63] Continuation-in-part of Ser. No. 431,930, Nov. 6, 1989, abandoned.

[51] Int. Cl.$^5$ .................. H01G 9/00; H01G 9/12
[52] U.S. Cl. ..................... 361/502; 361/521
[58] Field of Search .......... 361/272, 274, 328, 329, 361/502, 518–521, 517

[56] References Cited

U.S. PATENT DOCUMENTS

| | | | |
|---|---|---|---|
| 2,628,271 | 2/1953 | Brafman | 361/521 |
| 2,766,408 | 10/1956 | Georgiev et al. | 361/521 |
| 3,197,547 | 7/1965 | Peace et al. | 361/521 X |
| 3,277,350 | 10/1966 | Pearce et al. | 361/517 |
| 3,524,112 | 8/1970 | Ruttkay et al. | 317/230 |
| 3,555,370 | 1/1971 | Bowling | 317/230 |
| 3,669,302 | 6/1972 | Markarian | 220/44 R |
| 3,812,280 | 5/1974 | Deckert | 174/52 S |
| 3,869,314 | 3/1975 | Gillespie | 136/86 A |
| 3,909,302 | 9/1975 | Mermelstein | 136/177 |
| 4,010,406 | 3/1977 | West et al. | 361/272 X |
| 4,683,516 | 7/1987 | Miller | 361/328 |
| 4,713,731 | 12/1987 | Boos et al. | 361/433 |
| 4,769,745 | 9/1988 | Viernickel et al. | 361/518 |
| 4,776,523 | 8/1988 | Mori | 361/433 |

FOREIGN PATENT DOCUMENTS

| | | | |
|---|---|---|---|
| 1049630 | 2/1979 | Canada | 361/272 |
| 87421 | 7/1980 | Japan | 361/272 |

Primary Examiner—Donald A. Griffin
Attorney, Agent, or Firm—Leydig, Voit & Mayer

[57] ABSTRACT

A package for an electrical component that generates a gas during operation includes a selectively permeable body that allows the gas generated within the package to escape while preventing the escape of desired fluids from the package and the entrance of undesired fluids into the package. In a double layer capacitor according to the invention, the body may be a polymeric material, such as silicone rubber or polypropylene, through which carbon dioxide permeates relatively rapidly but through which water vapor permeates relatively slowly. A package including a container and an attached cover includes a resilient member disposed adjacent the periphery of the cover for dissipating forces that might be applied to an electrically insulating seal in the cover through which an electrical terminal passes.

27 Claims, 4 Drawing Sheets

ELECTRICAL COMPONENT PACKAGE

This application is a continuation-in-part of application Ser. No. 07/431,930, filed Nov. 6, 1989, and now abandoned.

FIELD OF THE INVENTION

The present invention relates to packages for electrical components that generate a gas during operation. More particularly, the present invention relates to packaging allowing generated gases to escape without the escape of desired fluids or the admission of deleterious materials.

BACKGROUND OF THE INVENTION

It is well known in the electrical packaging arts that certain electrical components, for example, electrolytic capacitors, electrochemical cells, batteries of electrochemical cells, and double layer capacitors, can produce gases during continued operation. The pressure of those gases can rupture or burst a package. In order to avoid undue pressure increases within packages containing such components, it is desirable that gases generated within the package escape.

Packages incorporating membranes or plugs that respond to excessive internal pressures are known. Those packages may incorporate a membrane that ruptures or a plug that fuses or is expelled from a package in response to excessive internal pressure. These "one time" pressure relief mechanisms are extremely undesirable in many applications. Once a membrane is ruptured or a plug is melted or expelled, the electrical component within a package is exposed to the ambient. Essential fluids within the package can escape and undesired fluids, such as oxygen and water, can enter the package to cause or accelerate corrosion or performance degradation mechanisms.

A porous diaphragm may also be used to release internal pressure. In U.S. Pat. No. 3,524,112, an electrolytic capacitor incorporating a membrane of rubber or neoprene having a diameter of 1 to 5 millimeters and a thickness of 0.5 to 2 millimeters is described. The membrane permits hydrogen diffusion out of the capacitor while preventing escape of the electrolyte. That patent describes an electrolytic capacitor casing having a groove. A polycarbonate foil having a thickness of 0.02 millimeters is wrapped around the casing over the groove. When pressure within the capacitor becomes too large, an edge of the foil is temporarily displaced from the package surface to allow gas to escape. In addition, the foil permits hydrogen diffusion from within the capacitor. The displacement of the foil means that foreign matter can enter and electrolyte can escape from the package.

A battery vent employing a membrane that is permeable to oxygen and hydrogen but that is impermeable to the sulfuric acid electrolyte is described in U.S. Pat. No. 3,909,302. The membrane, having a thickness of 0.1 to 0.8 millimeters, is microporous polytetrafluoroethylene. The membrane holds back the liquid battery electrolyte while permitting the diffusion of gases out of the battery so long as the liquid electrolyte does not occlude the membrane.

Double layer capacitors employ electrolytic elements comprising activated carbon and an electrolyte, typically sulfuric acid. The carbon contains many pores, producing a very large surface area for charge storage. Two of these electrolytic elements are brought together with an intervening ion/electron selective membrane to form a capacitor element. For increased operating voltage, many of the capacitor elements are stacked with intervening electrically conductive plates as terminals of the individual capacitor elements. See U.S. Pat. No. 4,683,516, the disclosure of which is incorporated herein by reference.

Double layer capacitors have an extremely high energy storage density. Capacitances of one farad and more with essentially unlimited voltage capabilities can be produced by connecting double layer capacitor elements in parallel and series. It is now known that double layer capacitors can generate a gas during operation. Little attention has been given to that gas generation and, to the inventor's knowledge, no one has previously attempted to identify the gas generated. The inventor has learned from chromatographic analysis that the gas generated is carbon dioxide. At least some of the carbon dioxide is believed to be reactively produced from oxygen that has been absorbed on the carbon in the capacitor elements and from oxygen that may leak into the package. Some carbon dioxide generation can be prevented or limited by employing highly purified materials in a double layer capacitor, but the extra cost of purification makes such capacitors unreasonably expensive. In view of the identification of the generated gas as carbon dioxide, venting of carbon dioxide and exclusion of external oxygen from a packaged double layer capacitor has been recognized by the inventor as an important packaging goal.

Even though the total amount of carbon dioxide generated in a double layer capacitor is relatively small, the small volume of a typical double layer capacitor package that is not occupied by solid materials, i.e., the "empty volume", means that relatively large pressures can result from the generated gas. For example, a package having an "empty volume" of one cubic centimeter may be able to withstand an internal pressure of ten atmospheres without bursting. If the packaged capacitor has a design lifetime of ten years, the average gas generation rate cannot exceed about $3 \times 10^{31\ 6}$ moles per year without bursting the package before the end of its design lifetime. Extremely high purity materials are required to avoid exceeding that tiny gas generation rate.

In double layer capacitors, as in other electrical components that generate gases, a displaceable, fusible, or rupturable plug or a similar pressure-relief mechanism that gives access, even temporarily, to the inside of the package is highly undesirable. That access permits the undesirable entry of deleterious materials into the package and allows useful materials, i.e., the electrolyte, to escape, seriously degrading performance. In double layer capacitors, electrolyte loss, measured by the decrease in the weight of the packaged component, causes a catastrophic decline in capacitance and increase in equivalent series resistance (ESR). (The ESR is a measure of the degree of difficulty of charging and discharging a capacitor. Since a high ESR means a capacitor has failed, ESR is a particularly sensitive indicator of a capacitor's condition.)

In the typical double layer capacitor, a stack of capacitor elements is placed under a compressive force to maintain good electrical contact in the stack. For example, double layer capacitor packages typically employ concave end caps crimped to another part of the package to apply a compressive force to a capacitor element stack. If gas pressure within a double layer capacitor package grows without relief, the double layer capacitor package, including a concave end cap, may be distorted, changing the compressive force applied to the stack of double layer capacitor elements and reducing performance. This source of performance reduction over time, i.e., package distortion and "unloading" of the compressive force on a stack of capacitance elements, has not previously been appreciated and no solution has been proposed.

Accordingly, it is desirable to provide a package for an electrical component that generates a gas during operation that permits the generated gas to escape from the package, that retains desired fluids within the package, and that prevents undesirable materials from entering the package. Most preferably, the package, by selectively venting the gas generated within it, eliminates any necessity for special purification of the constituents of the packaged electrical component that would increase the cost of the packaged component and prevents package distortion so that a stable compressive force is applied to the electrical component within the package during its design lifetime.

SUMMARY OF THE INVENTION

According to the present invention, a package for an electrical component that generates a gas during operation includes a container for housing an electrical component, a cover for sealing an opening in the container to enclose the electrical component, and a selectively permeable body disposed in an aperture in the package, the body having a relatively high permeability to gas generated within the package during operation of the electrical component and a relatively low permeability to at least one other fluid, such as water that may be present inside and/or outside the package. The permeable body is preferably a polymeric material, such as silicone rubber, polypropylene, butyl rubber, and natural rubber. Other materials, such as polytetrafluoroethylene and polyethylene of various densities, may be also be employed as the selectively permeable body. The area and thickness of the permeable body are chosen to permit the permeation and escape of generated gas at a rate that limits the pressure increase within the package to an acceptable value while limiting the permeation of desired fluids, such as water and/or an electrolyte, out of the package to avoid premature failure of the component.

The container and cover may be engaged by welding or by crimping. In the, latter embodiment, the selectively permeable body may be disposed on the crimped engagement rather than in a special aperture.

In a preferred embodiment of the invention, an electrical terminal passes through the package for establishing an electrical connection to the electrical component in the package. In one embodiment, the terminal is centrally located in the cover and the cover peripherally engages the container. A resilient member is disposed within the package between the electrical component and the periphery of the cover to assist in maintaining the desired compressive force on the packaged component and in reducing the stresses applied to the seal. Forces are applied to the periphery of the cover rather than being concentrated on the seal. When the package includes an electrical terminal passing through the container or cover, the terminal may be mounted and insulated from the container or cover with the selectively permeable body.

The package according to the invention may be employed to house one or more electrochemical cells or double layer capacitor elements, an electrolytic capacitor, and other electrical components.

Other objects and advantages of the present invention will become apparent from the detailed description given hereinafter. It should be understood, however, that the detailed description and specific embodiments are given by way of illustration only, since various changes and modifications within the spirit and scope of the invention will become apparent from the detailed description.

BRIEF DESCRIPTION OF THE DRAWING FIGURES

DETAILED DESCRIPTION OF PREFERRED EMBODIMENTS

The invention is described below particularly with respect to a packaged double layer capacitor. However, the invention can also be employed to package other electrical components, such as electrolytic capacitors and electrochemical cells, that can produce a gas in the course of operation.

Figure 1:
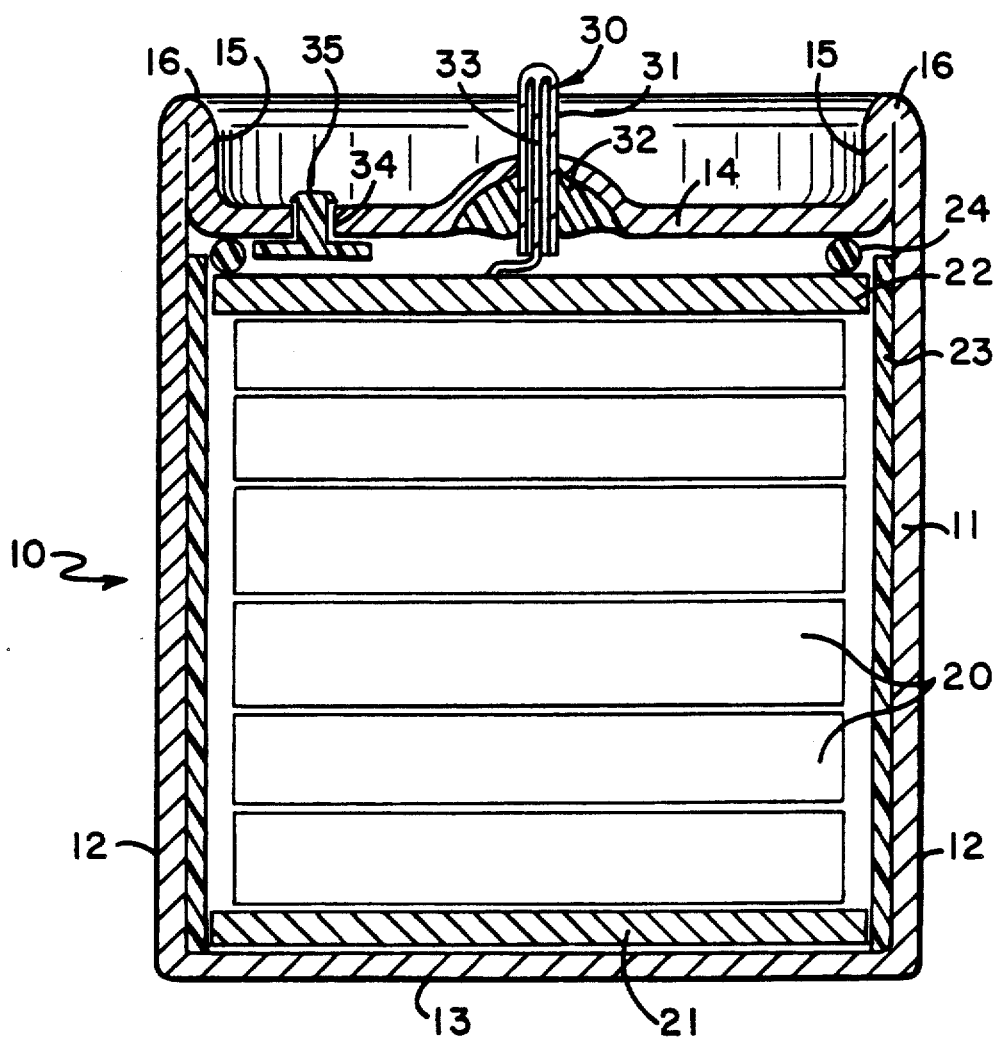
FIG. 1 is a cross-sectional view of an embodiment of a package and a packaged double layer capacitor according to the invention.

FIG. 1 is a sectional view of a package according to the invention and, specifically, a packaged double layer capacitor 10. FIG. 1 (like FIG. 5) is not drawn to any scale and elements have been drawn for clarity without regard to actual dimensional relationships. The package 10 includes a container 11, which is frequently cylindrical in transverse cross-section, including preferably unitary side walls 12 and an end wall 13. The container 11 contains an opening opposite the end wall 13 which, in the package 10, is closed by a cup-shaped cover 14. In the embodiment of the invention shown in FIG. 1, the cover 14 has upstanding flanges 15 that have essentially the same outer dimensions as the inner dimensions of the container 11. Accordingly, the cover 14 fits snugly inside the container 11. Preferably, the container 11 and the cover 14 are made of a metal, such as stainless steel, a plated steel that resists corrosion, titanium, tantalum, niobium, and alloys of these metals.

Figure 5:
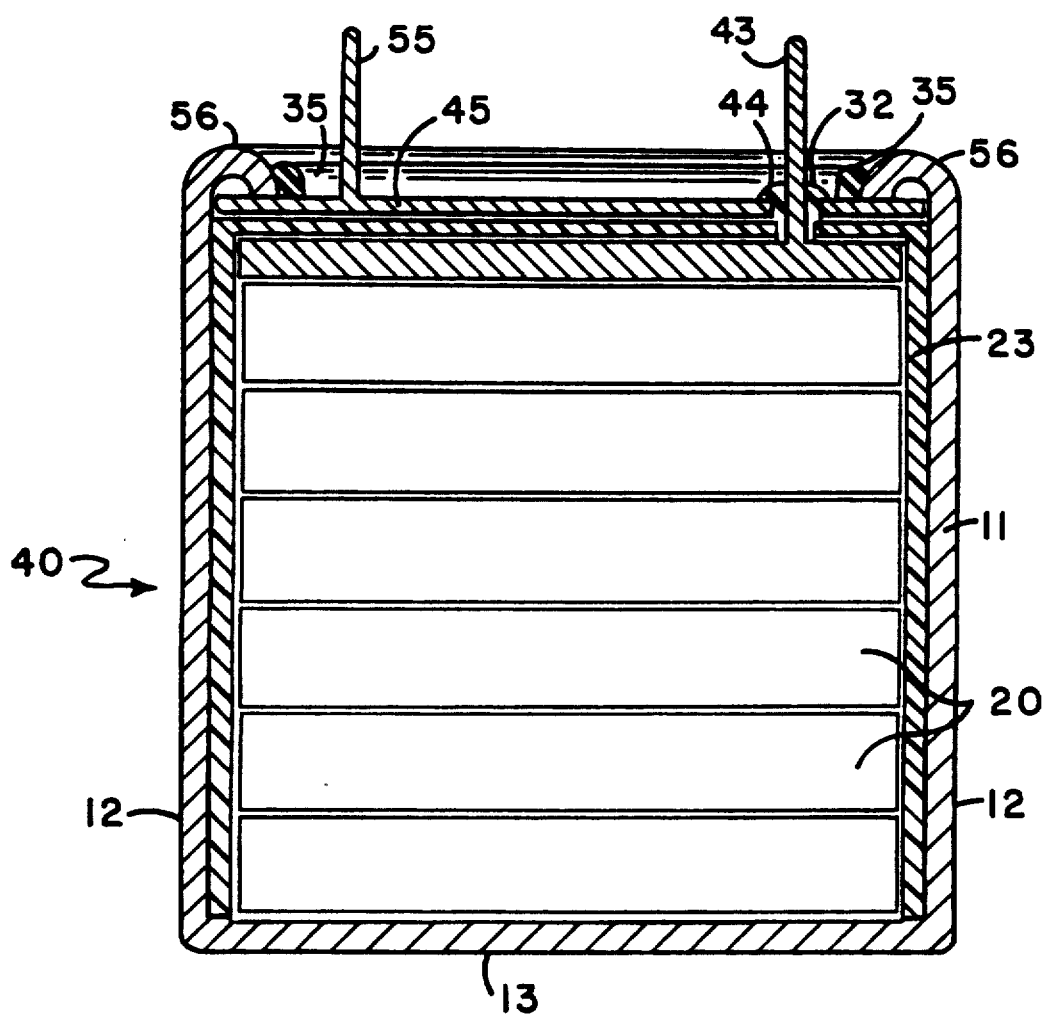
FIG. 5 is a cross-sectional view of another embodiment of a package and a packaged double layer capacitor according to the invention.

In the embodiment of FIG. 1, the container 11 and the cover 14 are joined to each other at a circumferential weld 16 where those two parts are in mechanical contact. That weld 16 provides an hermetic attachment of the container 11 to the cover 14. That hermetic attachment is in contrast to conventional packaging employing a container and cover attached by crimping. In the crimped package, the container and/or the cover are bent into mechanical contact, frequently into a configuration having a Ushape in cross-section as shown in FIG. 5. In some instances, a resin or other electrically inert material is applied along the crimped seam. Those crimped packages are not hermetically closed and can permit electrolyte to escape from the package.

A stack of capacitor elements 20 is disposed within package 10. The elements 20 are electrically connected to each other in series through their geometrical arrangement. (The elements of stack 20 could also be, for example, electrochemical cells or a single electrolytic capacitor wound in conventional "jelly roll" fashion.) One end of the stack rests upon an electrically conductive plate 21 which is disposed on the end wall 13 of the container 11. The direct contact between the plate 21, which may be tantalum welded to the end wall 13, and the container 11 makes the container one of the terminals, usually the cathode, of the capacitor. At the other end of the stack of capacitor elements 20, proximate the cover 14, a second electrically conductive plate 22, usually the anode of a double layer capacitor, is disposed on the stack. In order to avoid electrical and mechanical contact between the second plate 22 and the container 11, an electrically insulating liner 23 is disposed on the inside of the side wall 12 of the container 11. The liner 23 may be polypropylene, polyethylene, polytetrafluoroethylene, or a similar polymer.

A compressive force is applied to the capacitor elements 20 by the cover 14 through a resilient retaining member 24 disposed between the cover 14 and the second plate 22. The resilient retaining member 24, which may be an O-ring, is made of a material that is not susceptible to damage from the electrolyte and other corrosive materials that may be present within the package 10. For example, the retaining member 24 may be ethylene polypropylene, a butyl fluorocarbon, silicone rubber, chlorosulfonated polyethylene, and like materials.

The cover 14 contains a central opening through which a terminal 30 extends. The terminal 30 includes an electrically conducting tube 31, i.e., a metal tube, that is insulated from, yet sealed to, the cover 14 through a conventional annular insulating seal 32. A wire 33 disposed within the tube 31 extends to and is mechanically and electrically in contact with the second plate 22. Wire 33 is welded to the end of the tube 31 to seal the tube and complete the electrical terminal.

The cover 14 includes a relatively small aperture 34 in which a permeable body 35 is disposed. The permeable body 35 also extends over the inside surface of the cover 14 adjacent the aperture 34 for bonding the body 35 in place and to increase its mechanical strength. The permeable body 35 is adhered to the cover 14 either by self-adhesion or by means of an intervening adhesive (not shown).

As discussed above, carbon dioxide gas is generated during operation of a double layer capacitor, possibly from the reaction of absorbed oxygen and/or oxygen that enters the package with the carbon in the capacitor element. Therefore, in this application, the permeable body 35 should allow carbon dioxide to permeate relatively readily in order to escape from the package 10. On hand, the same permeable body 35 should limit the escape of electrolyte, water, and water vapor, the latter of which are present at least when the electrolyte is an aqueous solution, from the package 10. In addition, the permeable body 35 should resist the permeation of oxygen and other fluids and prevent the entry of foreign materials into the package 10.

In order to identify candidate materials for the permeable body 35, the relative rates of permeation of carbon dioxide and water vapor through various polymeric materials were compared. In Table 1, those relative permeation rates, in self-consistent units, are listed along with a calculated ratio of the relative carbon dioxide permeation rate to the relative water vapor permeation rate. That ratio provides a figure of merit indicating the relative suitability of each polymeric material as the selectively permeable body.

TABLE 1

| Polymeric Material | Relative Permeation Rates $CO_2$ | $H_2O$ | Permeation Rate Ratio |
|---|---|---|---|
| Poly(vinylidene chloride) | 1.2 | 7.9 | .15 |
| Epoxy | 35 | 160 | .22 |
| Saran | 18 | 20 | .9 |
| Poly(vinyl chloride) | 79–157 | 80–120 | 1 |
| Poly(vinylidene fluoride) | 59 | 39 | 1.5 |
| Styrene-acrylonitrile copolymer | 1100 | 630 | 1.8 |
| ABS | 1380 | 490 | 2.8 |
| Polychlorotrifluoroethylene | 47 | 12 | 3.9 |
| Polycarbonate | 2156 | 550 | 3.9 |
| Polyoxyphenylene | 2560 | 590 | 4.3 |
| Polystyrene | 4920 | 510 | 9.7 |
| Ethylene-vinyl acetate copolymer | 23600 | 1575 | 15 |
| Neoprene | 7870 | 200 | 39 |
| Polybutadiene | 31000 | 670 | 46 |
| High density polyethylene | 1180 | 20 | 59 |
| Natural rubber | 31500 | 470 | 67 |
| Polypropylene | 1700 | 20 | 89 |
| Silicone rubber | 177000 | 1970 | 90 |
| Low density polyethylene | 5900 | 60 | 98 |
| Butyl rubber | 15000 | 80 | 188 |
| Polytetrafluoroethylene | 2360 | 10 | 236 |

According to Table 1, the most attractive candidates for a selectively permeable body allowing a flow of carbon dioxide but resisting a flow of water vapor are polytetrafluoroethylene, butyl rubber, low density polyethylene, silicone rubber, polypropylene, and natural rubber. Of these candidate materials, silicone rubber is particularly attractive because of its natural adhesive properties. No adhesive is needed to mount a silicone rubber body in the aperture 34. The silicone rubber is applied in its fluid state and adheres tightly to cover 14 upon curing. Polytetrafluoroethylene, unless specially treated, for example, by selective etching, is notoriously difficult to bond, particularly to metals. Likewise, butyl rubber and, in some instances, polypropylene can be difficult to adhere to metals. The permeaability of any adhesive selected for mounting the permeable body 35 in the aperture 34 must be given consideration. If the adhesive is exposed in a path extending through the package 10 and has a high permeability for water, oxygen, and the like relative to body 35, that high permeability can overwhelm the desired permeability characteristics of the body 35.

The actual permeation rate of a particular body 35 depends upon, among other factors, the thickness of the body 35 in the aperture 34, the area of the aperture 34, the temperature of the body 35, and the pressure differential across the body 35. The permeation rate is controlled by the area of aperture 34 and body 35, the thickness of body 35, and the material of body 35.

In a package where gas is generated at a rate R, the internal pressure increase $\Delta P$ may be expressed as $$\Delta P = P_i - P_o = tR/A\sigma$$

where
$P_i$ = the internal fluid pressure in a package
$P_o$ = the initial fluid pressure in a package, typically one atmosphere
t = the thickness of the body through which fluids permeate
A = the cross-sectional area of the body through which fluids permeate
$\sigma$ = the permeability of the body.

Figure 4:
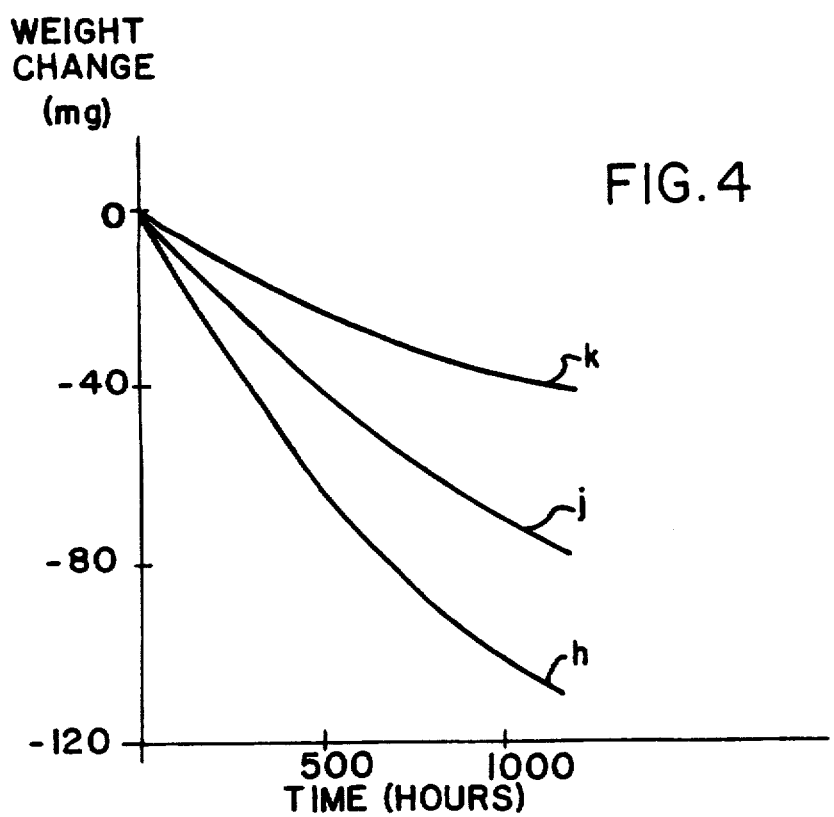
FIG. 4 is a graph of the change in weight as a function of operational time for packaged double layer capacitors according to the prior art and according to embodiments of the invention.

Thus, for a particular maximum internal pressure, $P_{imax}$, representing a maximum internal pressure change $\Delta P$, that a package is intended to withstand, a particular permeable body material, and a particular gas generation rate, the ratio of the thickness to the area of the permeable body for avoiding excessive internal package pressures can be determined. Since the initial internal pressure in the package is nominally one atmosphere, $\Delta P$ is usually equivalent to the gauge pressure within the package. To maintain a desired permeation rate for a generated gas for a particular thickness permeable body, the area of the body can be determined from the equation. Obviously, increasing the area of the decreasing the thickness of the permeable body increase the rate of the generated gas permeation and limit the rise in internal pressure within the package. However, the rate of permeation must not be allowed to become too large. Otherwise, desired fluids, such as water and electrolyte, escape so rapidly from the package that the component within the package fails prematurely. Typical examples of permeable body dimensions producing performance similar to that described below in FIG. 4 are about 15 mils in diameter and about 20 mils in thickness for a silicone rubber body and about 30 mils in diameter and 10 mils in thickness for a polypropylene body. Larger area and thinner permeable bodies can be produced by coating a relatively stiff porous membrane with the permeable material.

Figure 2:
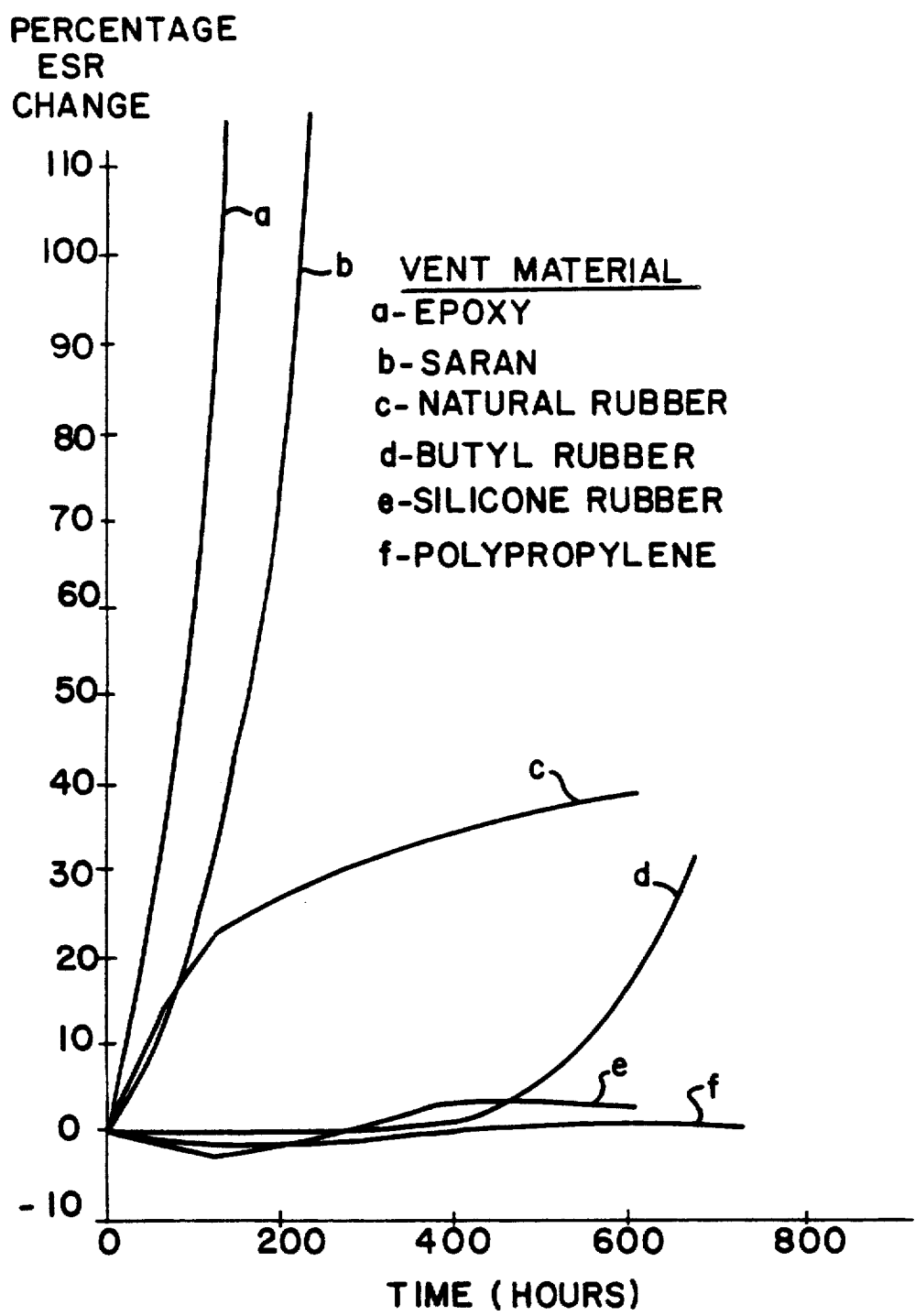
FIG. 2 is a graph of the change in equivalent series resistance for packaged double layer capacitors incorporating various materials as selective vents.

To demonstrate the effectiveness of various polymeric materials, packaged double layer capacitors of the type shown in FIG. 1 were constructed with permeable bodies of different materials. The capacitors were subjected to a test at 85 degrees Centigrade with 5.5 volt signals impressed across the electrodes. The change in ESR over time of each of these samples was measured and the results are reported in FIG. 2 for six different permeable materials. These results confirm that stable double layer capacitor performance is obtained when the package selectively permits carbon dioxide to escape from the package while preventing water and oxygen from entering or escaping from the package. As shown in FIG. 2, the best performance was obtained when the permeable body was silicone rubber (curve e), having a thickness-to-area ratio of about 113/inches preferably filled with silica to improve its mechanical strength, and polypropylene (curve f). Good, but lesser quality, performance was obtained with butyl rubber having a thickness-to-area ratio of about 1.9/inches curve d), although it has a figure of merit in Table 1 twice as large as silicon rubber and polypropylene. Natural rubber having a thickness-to-area ratio of about 140/inches (curve c) showed fair performance, while epoxy (curve a) and saran (curve b) with thickness-to-area ratios of 0.1 and 0.83/inches, respectively were unacceptable. This later result is expected from Table 1 which shows that epoxy and Saran have figures of merit less than one.

A large ratio of thickness-to-area of a permeable body can lead to an undesirably high internal package pressure. Tests were carried out with silicone rubber permeable bodies having thickness-to-area ratios of 215/inches mounted in four packaged double layer capacitors. The capacitor packages all bulged from internal gas pressure increases shortly after the described testing began and ultimately ruptured in the same fashion that hermetically sealed double layer capacitors have been observed to fail. Thus, the maximum thickness-to-area ratio of silicone rubber bodies effective in packaged double layer capacitors according to the invention is at least 120/inches and less than about 200/inches. Other materials likewise have upper limits on thickness-to-area ratios that avoid excessive package pressures, but those ratios vary with the particular material. For the foregoing successful example employing a polypropylene body, the thickness-to-area ratio is 141/inches, suggesting an upper limit, based on the silicone rubber experience, of about 230/inches for polypropylene bodies in double layer capacitors.

In order to confirm the substantial improvements obtained through the invention as compared to prior art packaged double layer capacitors, measurements of comparable prior art and novel structures were made. The results of those measurements are reported in FIGS. 3 and 4. The prior art packaged double layer capacitors were of two types. Hermetically sealed capacitors of the type described in U.S. Pat. No. 4,683,516 were tested. In addition, capacitors including a conventional crimped package were also tested. The hermetic package prevented the loss of any gas and the loss of any electrolyte. The crimped package permitted some gas and electrolyte to leave the package as well as allowing water vapor, oxygen, and other fluids to enter the package. The ESR as a function of time was measured for the same conditions, i.e., 85 degrees Centigrade and 5.5 volts, applied to the capacitors to produce the results reported in FIG. 2.

Figure 3:
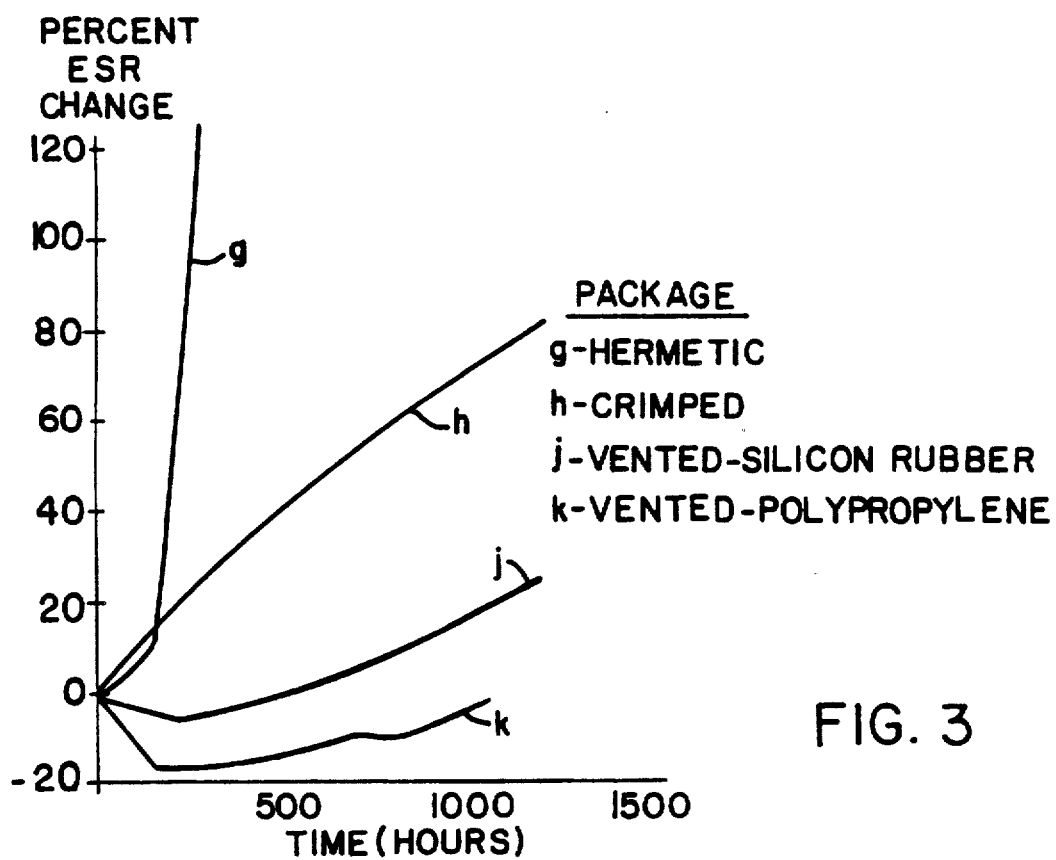
FIG. 3 is a graph of the change in equivalent series resistance as a function of operational time for packaged double layer capacitors according to the prior art and according to embodiments of the invention.

In FIG. 3, the percentage change in ESR is plotted as a function of time. The rapid build-up of gas pressure and, potentially, the distortion of the package, changing the compressive force applied to the capacitor stack, in the hermetically sealed package (curve g) resulted in an extreme change in ESR in a relatively short time. The hermetically sealed capacitor failed after about 200 hours. The crimped packaged capacitor (curve h) showed a less rapid increase in ESR, but the ESR reached an unacceptable level after about 1,500 hours. By contrast, in packages according to the embodiment of the invention shown in FIG. 1 (curves j and k), the change in ESR was less than 20 percent after 1,000 hours, indicating continuing good performance.

In FIG. 4, the change in weight of the packaged double layer capacitors according to the invention and in a crimped package are plotted. No information is provided in FIG. 4 for a hermetically sealed package since its weight cannot change as a result of the gain or loss of materials. In the other packages, weight is lost through escaping fluids during capacitor operation and, in the crimped package, from the loss of electrolyte. FIG. 4 shows that the rate of weight loss with time and the total weight loss is significantly improved in packages according to the invention (curves j and k) over the crimped package (curve h). These results indicate that relatively little electrolyte is lost from the novel package, meaning that extended performance can be expected.

An advantage of the package 10 that is not present in the prior art hermetic and crimped packages is the resilient retaining member 24 at the periphery of the cover 14 and second plate 22. As described above, prior art packages rely on package shape and/or deformation to establish a compressive force on the stack of capacitor elements 20. In the structure of FIG. 1, the relatively thick, stiff plates 21 and 22 are disposed at opposite ends of the stack of capacitor elements 20. Those plates 21 and 22 prevent significant bending or other deflection of the capacitor elements 20. The desired force is maintained on the stack through the compressed resilient retaining member 24 which has a lower effective spring constant than a concave end cap. Therefore, any change in the length of the stack of capacitor elements 20 is compensated by the resilience of the member 24. Preferably, the member 24 is a highly compliant elastomer that is resistant to the taking of a permanent "set" as the result of constant compression. A typical member 24 has a resilience of about 80 durometer which provides about one-fourth the spring constant of the prior art metal package using a concave end cover to apply a compressive force to the capacitor elements 20. Thus, the resilient member is about four times more effective in maintaining a constant load on the stack of capacitor elements 20 than a concave cover.

The use of the peripherally disposed resilient member 24 also assists in maintaining the integrity of the package under harsh conditions, such as thermal and mechanical shock. The seal 32 is preferably a glass-to-metal seal, although an epoxy with appropriate permeability characteristics may also be used as seal 32. These seals are generally brittle and, therefore, inherently weak in response to tensile forces. The embodiment of FIG. 1 reduces the tensile forces that are applied to the seal 32. Axial forces from the capacitor elements 20 are resisted by first and second plates 21 and 22. The second plate 22 is resiliently restrained by the member 24 which transmits any axial force to the area of the attachment of the container 11 and the cover 14. In prior art packages, like that described in U.S. Pat. No. 4,683,516, an electrode plate directly transmits axial forces over the total area of a cover, including directly to the area of seal 32. However, in the invention the transmission of such forces, whether created by the capacitor elements 20, mechanical or thermal shock, or otherwise, directly to the seal 32 is avoided. Instead, the strong mechanical attachment of the container 11 to the cover 14 receives the forces, sparing the seal 32.

While the invention has been described with respect to the particular embodiment shown in FIG. 1, it is not limited thereto. For example, while the aperture 34 and the permeable body 35 filling that aperture are shown as disposed in the cover 14, they could be disposed in the container 11. The seal 32 could also be the permeable body 35 with aperture 34 being identical to the hole in cover 14 through which the electrical terminal 30 projects. The selectively permeable body may also be used with a package closed by crimping.

In another embodiment of the invention shown schematically in cross-section in FIG. 5, the permeable body is disposed between the container 11 and a cover 45 in a package 40 closed by crimping. In FIG. 5, the same elements that appear in FIG. 1 are given the same reference numbers. In FIG. 5, a container 11 includes unitary side walls 12 and an end wall 13. A plurality of capacitor elements 20 are disposed in a stack within the container 11. An electrically insulating cylindrical liner 23 separates and insulates the capacitor elements 20 from the container 11. The end of the stack of the capacitor elements 20 opposite the end wall 13 is covered by an electrically conductive plate 42 from which an electrical terminal 43, usually the anode terminal, projects. The terminal 43 projects through an opening 44 in a cover 45 and is electrically insulated from the cover 45 by a seal 32. The plate 42 is electrically insulated from the cover 45 by a portion of the cylindrical liner 23 that is opposite the end wall 13. The cover 45 includes a projecting second electrical terminal 55, usually the cathode of the packaged electrical component.

The container 11 includes a peripheral flange projecting away from the end wall 13. After installation of the electrical component 20, the plate 42, the liner 23, the cover 45, and the seal 32, that peripheral flange is bent, i.e., crimped, inwardly to form the peripheral U-shaped structures 56 shown in FIG. 5. The edge of the side wall 12 is bent to engage and apply a compressive force to the cover 45. As discussed above, while the crimping causes engagement of the container 11 and the cover 45, a tight seal is usually not formed. As a result, fluid leakage can occur at the junction between the container 11 and the cover 45. However, in accordance with the invention, a selectively permeable body 35 is disposed at the junction of the crimped side walls 12 and the cover 45, forming a selectively permeable seal. The permeable body 35 is selected to function in the same manner described above, i.e. permitting carbon dioxide or another gas produced during operation of the electrical component to escape from the package while retaining desirable fluids within the package and preventing undesirable fluids from entering the package. While the crimped package assembly alone is not novel, the combination of the selectively permeable material with the crimped package is new and provides the advantage of avoiding excessive internal package pressures, and retaining electrolyte and water vapor, thereby achieving the long term performance described for the package embodiment of FIG. 1.

The force-dissipating arrangement of FIG. 1 employing the peripherally disposed resilient retaining member between the container 11 and the cover 14 can be employed in a package of the crimped or hermetically sealed types, i.e., with or without a permeable body, as well as in the package embodiments of FIGS. 1 and 5, to improve performance by maintaining a relatively constant pressure on the electrical component 20.

While the invention has been described with respect to a double layer capacitor package, it is applicable to other electrical component packages. For example, a package according to the invention may be employed with electrolytic capacitors and electrochemical cells with a permeable body selected for a relatively high permeability for gases generated within the package and relatively low permeability for other fluids in the package and undesired fluids outside the package. Likewise, a package employing a peripherally disposed resilient retaining member may be employed with various unvented electrical component packages to dissipate stresses so they are not applied to the junctions of dissimilar materials at terminal feedthroughs.

I claim:

1. A package for an electrical component incorporating at least one desired fluid, such as water, and that can generate a gas during operation, the package withstanding a maximum internal pressure $P_i$ without damage, comprising:
   a metal container having an opening for receiving an electrical component;
   a metal cover for engaging the container, sealing the opening, and thereby enclosing the electrical component in a package; and
   means for selectively venting a gas generated in the package without exposure of the inside of the package to ambient comprising a selectively permeable body disposed in an aperture in one of the metal container and cover having a relatively high permeability to a gas generated within the package during operation of the electrical component and a relatively low permeability to at least one desired fluid inside the package, the permeable body having an area A and thickness t through which the gas generated in the package can permeate, wherein the ratio t/A is less than $\sigma P_i/R$, where $\sigma$ is the permeability of the body to the gas generated within the package and R is the rate of generation of the gas within the package, and sufficiently large to limit permeation of the desired fluid and thereby avoid premature failure of the electrical component whereby the gas generated within the package escapes from the package by permeation through the permeable body without exposure of the inside of the package to the ambient by any of rupture, fusion, expulsion, and displacement of the permeable body.

2. The package of claim 1 wherein the selectively permeable body is chosen from the group consisting of silicone rubber, polypropylene, natural rubber, butyl rubber, polytetrafluoroethylene, and polyethylene.

3. The package of claim 1 wherein the cover has a periphery for engaging the container including a first electrical terminal electrically insulated from and centrally passing through the cover, an electrically insulating seal mounting the first electrical terminal in the cover, and a resilient member disposed at the periphery of the cover inside the package for transmitting forces between the cover and the electrical component.

4. The package of claim 1 wherein the electrical component is chosen from the group consisting of at least one electrochemical cell, an electrolytic capacitor, and at least one double layer capacitor element.

5. The package of claim 1 including a first electrical terminal passing through the aperture for electrical connection to the electrical component wherein the selectively permeable body seals the first electrical terminal to and insulates the first electrical terminal from the package.

6. The package of claim 1 wherein the selectively permeable body is silicone rubber and t/A is less than about 200/inches and greater than about 12/inches.

7. The package of claim 1 wherein the selectively permeable body is polypropylene and t/A is less than about 230/inches and greater than about 14/inches.

8. A package for an electrical component incorporating at least one desired fluid, such as water, and that can generate a gas during operation, the package withstanding a maximum internal pressure $P_i$ without damage, comprising:
   a metal container having an opening for receiving an electrical component;
   a metal cover for crimping engagement with the container to close the opening and enclose the electrical component in a package; and
   means for selectively venting a gas generated in the package without exposure of the inside of the package to ambient comprising a selectively permeable body disposed on the crimped engagement of the metal container and cover having a relatively high permeability to a gas generated within the package during operation of the electrical component and a relatively low permeability to at least one desired fluid inside the package, the permeable body having an area A and a thickness t through which the gas generated in the package can permeate, wherein the ratio t/A is less than $\sigma P_i/R$ where $\sigma$ is the permeability of the body to the gas generated within the package and R is the rate of generation of the gas within the package, and sufficiently large to limit permeation of the desired fluid and thereby avoid premature failure of the electrical component whereby the gas generated within the package escapes from the package by permeation through the permeable body without exposure of the inside of the package to the ambient by any of rupture, fusion, expulsion, and displacement of the permeable body.

9. The package of claim 8 wherein the electrical component is chosen from the group consisting of at least one electrochemical cell, an electrolytic capacitor, and at least one double layer capacitor element.

10. The package of claim 8 wherein the selectively permeable body is chosen from the group consisting of silicone rubber, polypropylene, natural rubber, butyl rubber, polytetrafluoroethylene, and polyethylene.

11. The package of claim 8 wherein the selectively permeable body is silicone rubber and t/A is less than about 200/inches and greater than about 12/inches.

12. The package of claim 8 wherein the selectively permeable body is polypropylene and t/A is less than about 230/inches and greater than about 14/inches.

13. A packaged double layer capacitor comprising:
   at least one double layer capacitor element including carbon and an electrolyte in aqueous solution permeating the carbon that generates carbon dioxide gas during operation at a rate R;
   a metal container having an opening, the double layer capacitor element being disposed within and electrically connected to the container, the container providing a second electrical terminal of the double layer capacitor element;

a metal cover engaging the container, closing the opening, and thereby enclosing the double layer capacitor element in a package that can withstand a maximum internal pressure of $P_i$ without damage;

a first electrical terminal electrically insulated from and passing through one of the container and cover and electrically connected to the double layer capacitor element; and means for selectively venting carbon dioxide gas generated in the package without exposure of the double layer capacitor element to ambient comprising a selectively permeable body disposed on the crimped engagement of the container and cover having a relatively high permeability to carbon dioxide and a relatively low permeability to water vapor, the permeable body having an area A and a thickness t through which carbon dioxide can permeate, wherein the ratio t/A is no more than $\sigma P_i/R$ where $\sigma$ is the permeability of the body to the carbon dioxide and R is the rate of generation of the carbon dioxide, and is sufficiently large to limit the permeation of water vapor and thereby avoid premature failure of the capacitor whereby the carbon dioxide generated within the package escapes from the package by permeation through the permeable body without exposure of the double layer capacitor element to the ambient by any of rupture, fusion, expulsion, and displacement of the permeable body.

14. The packaged double layer capacitor of claim 13 wherein the permeable body is chosen from the group consisting of silicone rubber, polypropylene, natural rubber, butyl rubber, polytetrafluoroethylene, and polyethylene.

15. The packaged double layer capacitor of claim 13 wherein the cover includes a peripheral flange hermetically engaging the container.

16. The packaged double layer capacitor of claim 13 wherein the first electrical terminal is centrally disposed relative to the cover including an electrically insulating seal sealing the first electrical terminal to the cover and a resilient member disposed in the package at the periphery of the cover for transmitting forces between the periphery of the cover and the double layer capacitor element in the package.

17. The packaged double layer capacitor of claim 13 wherein the first electrical terminal passes through the aperture and the selectively permeable body seals the terminal to the package.

18. The packaged double layer capacitor of claim 13 wherein the selectively permeable body is silicone rubber and t/A is less than about 200/inches and greater than about 12/inches.

19. The packaged double layer capacitor of claim 13 wherein the selectively permeable body is polypropylene and t/A is less than about 230/inches and greater than about 14/inches.

20. A packaged double layer capacitor comprising:
at least one double layer capacitor element including carbon and an electrolyte in an aqueous solution permeating the carbon that generates carbon dioxide gas during operation at a rate R;

a metal container having an opening, the double layer capacitor element being disposed within and electrically connected to the container, the container providing a second electrical terminal of the double layer capacitor element;

a metal cover engaging the container, closing the opening, and enclosing the double layer capacitor element in a package that can withstand a maximum internal pressure of $P_i$ without damage, at least one of the container and cover being crimped to engage the other;

a first electrical terminal electrically insulated from and passing through one of the container and cover and electrically connected to the double layer capacitor element; and means for selectively venting carbon dioxide gas generated in the package without exposure of the double layer capacitor element to ambient comprising a selectively permeable body disposed on the crimped engagement of the container and cover having a relatively high permeability to carbon dioxide and a relatively low permeability to water vapor, the permeable body having an area A and a thickness t through which carbon dioxide can permeate, wherein the ratio t/A is no more than $\sigma P_i/R$ where $\sigma$ is the permeability of the body to the carbon dioxide and R is the rate of generation of the carbon dioxide, and is sufficiently large to limit the permeation of water vapor and thereby avoid premature failure of the capacitor whereby the carbon dioxide generated within the package escapes from the package by permeation through the permeable body without exposure of the double layer capacitor element to the ambient by any of rupture, fusion, expulsion, and displacement of the permeable body.

21. The packaged double layer capacitor of claim 20 wherein the permeable body is chosen from the group consisting of silicone rubber, polypropylene, natural rubber, butyl rubber, polytetrafluoroethylene, and polyethylene.

22. The packaged double layer capacitor of claim 20 wherein the selectively permeable body is silicone rubber and t/A is less than about 200/inches and greater than about 12/inches.

23. The packaged double layer capacitor of claim 20 wherein the selectively permeable body is polypropylene and t/A is less than about 230/inches and greater than about 14/inches.

24. A package for an electrical component comprising:
a container having an opening for receiving an electrical component;

a cover having a periphery for engaging the container and closing the opening by engagement of the periphery with the container, thereby enclosing the electrical component in a package;

a first electrical terminal electrically insulated from and centrally located in the cover for electrical connection to the electrical component;

an electrically insulating seal insulating the first electrical terminal from the cover; and a resilient member disposed adjacent the periphery of the cover inside the package for transmitting forces between the cover and the electrical component whereby forces applied to the seal are reduced.

25. The package of claim 24 wherein the electrical component is selected from the group consisting of at least one electrochemical cell, an electrolytic capacitor, and at least one double layer capacitor element.

26. The package of claim 24 wherein said container and cover are welded at the periphery of the cover.

27. The package of claim 24 wherein at least one of the container and cover are crimped at the periphery of the cover.

* * * * *

UNITED STATES PATENT AND TRADEMARK OFFICE
CERTIFICATE OF CORRECTION

PATENT NO. : 4,992,910

DATED : February 12, 1991

INVENTOR(S) : David A. Evans

It is certified that error appears in the above-identified patent and that said Letters Patent is hereby corrected as shown below:

Column 2, line 42, change "$3 \times 10^{31}$ $^6$" to --$3 \times 10^{-6}$--.

Column 5, line 62, change "on hand" to --on the other hand--.

Column 7, line 43, change "of the decreas-" to --of and decreas---.

Signed and Sealed this

Eleventh Day of August, 1992

Attest:

DOUGLAS B. COMER

*Attesting Officer*     *Acting Commissioner of Patents and Trademarks*